June 7, 1927.
F. J. PETERS
DRILL HOLDER
Filed May 3, 1923
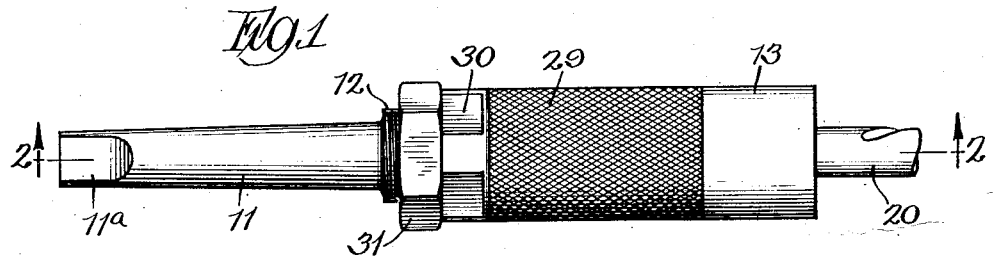
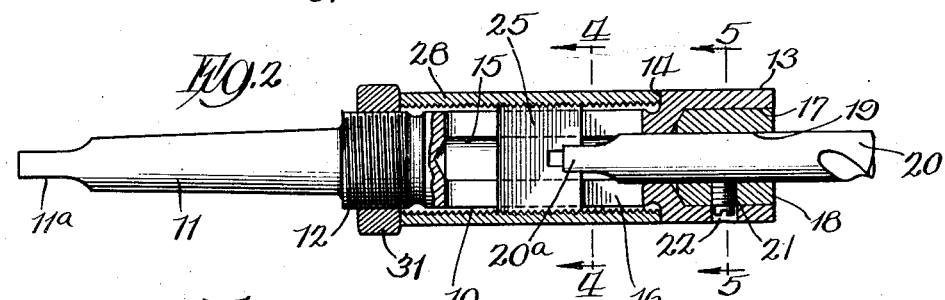
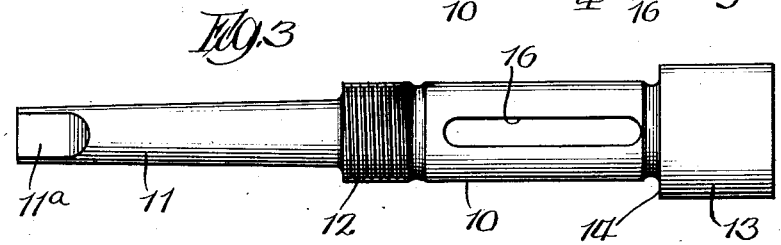
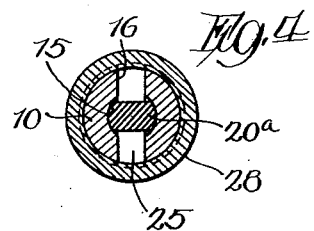   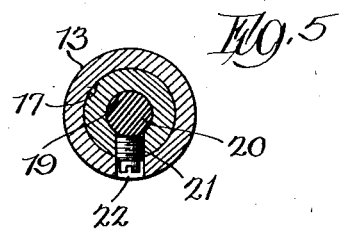
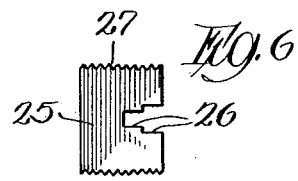   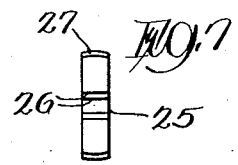
Inventor;
Frebert J. Peters
by Rector, Hibben, Davis & Macauley
Attys.

Patented June 7, 1927.

1,631,286

UNITED STATES PATENT OFFICE.

FREBERT J. PETERS, OF RICHMOND, INDIANA, ASSIGNOR TO THE NATIONAL AUTOMATIC TOOL CO., OF RICHMOND, INDIANA, A CORPORATION OF INDIANA.

DRILL HOLDER.

Application filed May 3, 1923. Serial No. 636,284.

This invention relates to drill holders and its purpose is to provide improved means for holding straight shank drills in a drill spindle. The principal object of the invention is to provide an improved drill holder of small diameter particularly adapted for use in multiple drilling where the various drills are closely arranged. A further object is to provide a drill holder having means for providing a positive drive for the drill and means for positively adjusting the drill longitudinally of the holder. Still another object is to provide improved means for receiving the thrust of the drill.

These and other objects of the invention will be more fully apparent from the following specification taken with the accompanying drawings, in which one embodiment is illustrated.

In the drawings Fig. 1 shows a side elevation of the assembled drill holder, Fig. 2 shows a longitudinal vertical section through the center line of the drill holder, Fig. 3 shows a top plan view of the body portion of the drill holder with other parts thereof removed, Fig. 4 shows a sectional view taken on the line 4—4 of Fig. 2, Fig. 5 shows a sectional view taken on the line 5—5 of Fig. 2, Fig. 6 shows a side elevation of the driving block, and Fig. 7 shows an end elevation of the driving block.

The drill holder comprises a body 10 having a tapered shank 11 adapted to fit the drill spindle, the shank being flattened at its upper end as shown at $11^a$. The upper end of the body portion of the drill is threaded as shown at 12 and the lower part 13 of the body member is enlarged in diameter, forming an annular shoulder 14. The body portion of the drill is provided with a longitudinal bore 15 extending upwardly from the lower end thereof, this bore being intersected above the shoulder 14 by a transverse slot 16. Within the part 13 at the lower end of the holder, the bore is enlarged as shown at 17 to receive the substantially cylindrical drill collet 18 which is provided with a bore 19 adapted to receive the straight shank drill 20. The drill is held in place within the collet by a set screw 21 which engages a transverse threaded hole in the collet and projects outwardly therefrom into the aperture 22 which is formed in the wall of the drill holder. Various collets 18, carrying drills of different sizes, may be inserted in the enlarged bore 17 of the holder, the collets being inserted before the drills are put in place by moving the set-screw 21 inwardly until the head thereof lies inwardly from the outward surface of the collet. The set-screw may then be reversed and moved outwardly into the aperture 22 until the drill 20 is in place.

The drill 20 is driven by the holder through a driving block 25 which is mounted in the slot 16 of the body member 10 and provided on its lower face with stepped notches 26 adapted to be engaged by the flattened upper extremities $20^a$ of drills of different sizes. The opposite ends of the block 25 are threaded as shown at 27 to be engaged by the internally threaded adjusting sleeve 28 which surrounds the body member 10 with the lower end thereof engaging the annular shoulder 14. The adjusting shell is preferably knurled on its outer side as shown at 29 and the upper portion thereof may be provided with flattened surfaces 30 adapted to be engaged by a wrench. A clamping nut 31 engages the threaded portion 12 of the body member 10 and coacts with the upper end of the shell 28 to hold the shell in fixed position between the nut and the annular shoulder 14.

To adjust the drill 20 vertically in he holder, it is merely necessary to release the set-screw 21 sufficiently to permit the drill to move in the collet 18 and then release the clamping nut 31 to a sufficient degree to allow the adjusting shell 28 to be turned. Upon turning the adjusting shell, the driving block 25, being held against rotation by the walls of the slot 16, is moved longitudinally within the slot and may be caused to assume any desired position therein.

Although I have shown and described a certain form of the invention for purposes of illustration it will be understood that it may be constructed in various other embodiments without departing from the scope of the appended claims.

I claim:

1. A drill holder comprising a body member formed with an intermediate portion provided with a transverse slot and terminating at its forward end in a head; a drill centralizing collet removably secured in said head; a combined drill rotating and backing-block translatably mounted in said slot and having its projecting ends threaded; an internally threaded sleeve rotatably but non-translatably journaled coaxial with the intermediate portion of said body member and having a threaded connection only with said block; and means permitting said sleeve to be rotated to adjust said block axially of said body member.

2. A drill holder comprising a body member formed with an intermediate portion provided with a transverse slot and terminating in a head; means carried by said head to centralize a drill-shank co-axial with said head; means independent of said drill locating means to determine the position of a drill lengthwise of said drill-holder and to prevent relative rotation between said drill and the drill holder, said last named means including a block translatably mounted in said slot and formed with a drill receiving notch; an internally threaded sleeve completely surrounding said slotted intermediate portion and having a threaded connection with said block; means permitting rotation of said sleeve to adjust said block in said slot; and means to prevent endwise movement of the sleeve.

3. A drill holder comprising a one-piece body-member providing a cylindrical intermediate portion having an elongated diametral slot and terminating at its forward end in a shouldered head, said head and intermediate portion being centrally recessed to receive the shank of a drill; and interiorly threaded elongated sleeve coextensive in length with said slot and rotatably mounted on said intermediate portion; said sleeve being arranged to bear against said shoulder and to be restrained thereby against translation; a backing-block translatably mounted in said slot and having its protruding edges threaded to engage the interior threads of said sleeve and adapted to be shifted in said slot by a rotation of said sleeve; said block being notched to engage the shank of a drill to hold it against turning and to determine the extent of entry of said drill; and a clamp-nut threaded on said body-member and adapted when tightened to urge said sleeve against said shoulder and thereby clamp it against turning.

4. A drill-holder comprising a body member formed with an intermediate portion provided with a transverse slot; means at the forward end of said body member to hold a drill against rotation relative to said body member; a drill backing-block slidably mounted in said slot and adapted to determine the axial position of a drill; and a sleeve rotatably but non-translatably surrounding said intermediate portion and having an operative connection with said block, said sleeve serving, upon rotation, to shift said block axially of said body member without affecting the means for preventing relative rotation between the drill and body member; said parts being so constructed and arranged that drills of various diameters may each be held in said drill-holder in various axial positions and backed up by said block.

5. A drill-holder comprising a body member formed with an intermediate portion having a transverse slot and provided, adjacent its forward end, with a shoulder; means at the forward end of said body member to hold a drill against rotation relative to said body-member; a drill backing-block slidably mounted in said slot and adapted to determine the axial position of a drill; a sleeve rotatably but non-translatably surrounding said intermediate portion and having a threaded connection with said block, said sleeve being arranged to bear against said shoulder and to be restrained thereby against translation and being adapted, upon rotation, to shift said block axially of said body member without affecting the means for preventing rotation of the drill in the drill-holder; and a clamp nut threaded upon said body member and adapted, upon rotation, to urge said sleeve against said shoulder and thereby prevent rotation of said sleeve.

6. A drill-holder combining a body-member formed with an intermediate portion provided with a transverse slot; means adjacent the forward end of said body-member to hold a drill against rotation relative to said body member; means, independent of said first mentioned means, to hold a drill against rotative and axial movements with respect to said body member, said last mentioned means including an abutment block translatably but non-rotatably mounted in said slot and provided with a drill-receiving notch adapted to prevent relative rotation between the drill and the block; a rotatable sleeve having a threaded connection with said block and adapted, upon rotation to translate said block; and means to prevent translation of said sleeve.

7. A drill-holder combining a body member formed with an intermediate portion having a transverse slot and provided adjacent its forward end with a shoulder; means adjacent the forward end of said body-member to prevent relative rotation between said body-member and a drill inserted therein; a combined drill rotating and backing-block translatably mounted in said slot and provided with a drill-receiving notch adapted to prevent relative rotation between the drill and the block; a rotatable sleeve surrounding said intermediate portion and having a threaded connection with said block, said sleeve being arranged to bear against said shoulder and to be restrained thereby against translation and being adapted upon rotation to shift said block in said slot; and a clamp nut threaded upon said body member and adapted upon rotation to urge said sleeve against said shoulder thereby to clamp said sleeve against rotation.

FREBERT J. PETERS.